(12) United States Patent
Henry et al.

(10) Patent No.: US 10,470,352 B2
(45) Date of Patent: Nov. 12, 2019

(54) AGRICULTURAL IMPLEMENT WITH RELEASABLE TOOLS

(71) Applicant: CNH Industrial Canada, Ltd., Saskatoon (CA)

(72) Inventors: James W. Henry, Saskatoon (CA); Ross L. Gingrich, Roanoke, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 59 days.

(21) Appl. No.: 15/419,046

(22) Filed: Jan. 30, 2017

(65) Prior Publication Data
US 2018/0213710 A1    Aug. 2, 2018

(51) Int. Cl.
*A01B 15/02*    (2006.01)
*A01B 15/18*    (2006.01)
*F16B 7/04*    (2006.01)

(52) U.S. Cl.
CPC .............. *A01B 15/02* (2013.01); *A01B 15/18* (2013.01); *F16B 7/042* (2013.01)

(58) Field of Classification Search
CPC ....... A01B 15/02; A01B 35/225; A01B 35/22; A01B 35/26; A01B 49/027; F16B 7/042
See application file for complete search history.

(56) References Cited

U.S. PATENT DOCUMENTS

| | | | |
|---|---|---|---|
| 2,757,595 A | 8/1956 | Clifford et al. | |
| 2,908,340 A | 10/1959 | Love et al. | |
| 3,061,021 A * | 10/1962 | Shader | A01B 35/225 172/750 |
| 3,357,117 A * | 12/1967 | Petersen | A01B 15/025 172/762 |
| 4,115,021 A | 9/1978 | Loch | |
| 4,576,239 A * | 3/1986 | Launder | A01B 35/225 172/751 |
| 4,611,418 A * | 9/1986 | Launder | E02F 9/2841 172/750 |
| 4,751,785 A * | 6/1988 | Johansson | E02F 9/2841 172/713 |
| 5,007,484 A | 4/1991 | Johanson | |
| 5,027,535 A * | 7/1991 | Maguina-Larco | E02F 9/2825 37/455 |
| 5,558,165 A | 9/1996 | Bucher et al. | |
| 5,711,378 A | 1/1998 | Yeager | |

(Continued)

FOREIGN PATENT DOCUMENTS

FR    1.304.304 A    9/1962

OTHER PUBLICATIONS

"Perma-Loc Quick-Change System for Air Seeders and Field Cultivators", taken from jdparts.deere.com, Dec. 10, 2007 (7 pages).

*Primary Examiner* — Jamie L McGowan
(74) *Attorney, Agent, or Firm* — Rebecca L. Henkel; Rickard K. DeMille (57) ABSTRACT

An agricultural implement includes a frame, and a shank mounted to the frame which includes at least one clip edge. A retaining clip is press fitted to the at least one clip edge and includes a movable lock biased in a locking direction. The agricultural implement also includes a ground work tool with a locking opening at least partially filled by the movable lock to resist the tool from being removed from the shank.

3 Claims, 5 Drawing Sheets

(56) References Cited

U.S. PATENT DOCUMENTS

| | | | |
|---|---|---|---|
| 6,289,996 B1 * | 9/2001 | Parish | A01B 35/225 172/730 |
| 6,315,057 B1 | 11/2001 | Borter | |
| 6,315,058 B1 | 11/2001 | Birkenbach et al. | |
| 6,401,834 B1 * | 6/2002 | Yeomans | A01B 15/025 172/701.3 |
| 6,571,884 B1 | 6/2003 | Horvath et al. | |
| 6,684,963 B1 | 2/2004 | Poutre et al. | |
| 6,814,151 B1 | 11/2004 | Peck et al. | |
| 6,957,476 B2 * | 10/2005 | Poutre' | A01B 35/225 29/267 |
| 7,255,179 B2 * | 8/2007 | Pollard | A01B 35/225 172/683 |
| 7,493,964 B2 | 2/2009 | Henry et al. | |
| 8,037,944 B2 | 10/2011 | Arnabat Castellvi | |
| 2003/0075344 A1 * | 4/2003 | Zaun | A01B 35/225 172/730 |
| 2004/0083867 A1 | 5/2004 | Elock et al. | |
| 2005/0074279 A1 | 4/2005 | Ward et al. | |
| 2006/0005978 A1 * | 1/2006 | Zaun | A01B 35/225 172/730 |

\* cited by examiner

AGRICULTURAL IMPLEMENT WITH RELEASABLE TOOLS

BACKGROUND OF THE INVENTION

1. Field of the Invention

The present invention relates to agricultural implements, and, more particularly, to tillage implements which include ground working tools.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks which can carry various tools at their lower ends for tilling the soil, which can be referred to as ground working tools, such as shovels, sweeps, coulters, spikes, and plows. The field cultivator converts compacted soil into a level seedbed with a consistent depth for providing desirable conditions for planting crops. Grass or residual crop material disposed on top of the soil is also worked into the seedbed so that it does not interfere with a seeding implement subsequently passing through the seedbed.

Many tillage implements connect the shanks to the ground working tools using a screw-on connection, which securely fastens the many ground working tools to their respective shank. As tillage implements have increased in size and carried an increasing number of ground working tools, it has become extremely time-consuming to release all the ground working tools from their respective shanks and replace them onto the shanks. Further, screwing the ground working tools to the shanks requires an appropriate screwdriver, which a user might not have handy if one of the tools needs to be replaced in the field.

What is needed in the art is a tillage implement with ground working tools that can be easily removed and replaced.

SUMMARY OF THE INVENTION

The present invention provides a ground working tool with a tool clip which couples with a retaining clip to quickly lock and unlock the tool from a shank.

The invention in one form is directed to an agricultural implement including: a frame; a shank mounted to the frame and including at least one clip edge; a retaining clip press fitted to the at least one clip edge and including a movable lock biased in a locking direction; and a ground working tool with a locking opening at least partially filled by the movable lock to resist the tool being removed from the shank.

The invention in another form is directed to an agricultural implement including: a frame; a shank including a first end mounted to the frame and a retaining clip at a second end opposite the first end, the retaining clip having a locking opening formed therein; and a ground working tool including a tool clip with a reversibly deformable portion inserted into the locking opening to lock the tool clip to the retaining clip, the reversibly deformable portion being deformable when inserted within the locking opening to remove the reversibly deformable portion from the locking opening and allow the tool clip to unlock from the retaining clip.

An advantage of the present invention is the ground working tool can be quickly locked to the shank by advancing the tool clip along a tool guide of the retaining clip.

Another advantage is the ground working tool can be quickly removed from the shank by moving the movable lock or deforming the reversibly deformable portion out of the locking opening.

Yet another advantage is the movable lock and reversibly deformable portion can be configured to be manipulated by hand so no special tools are needed to lock and unlock the ground working tool from the shank.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
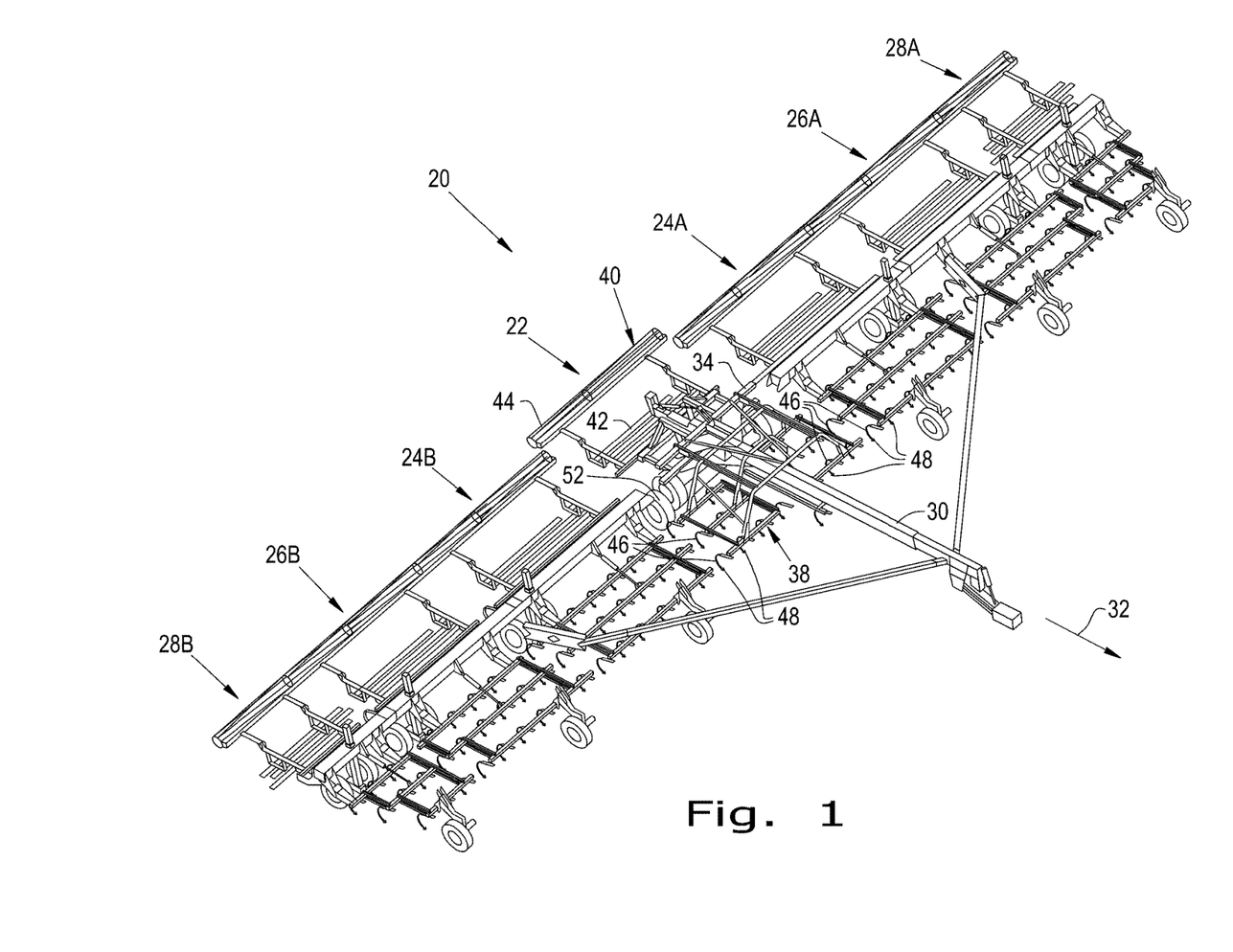
FIG. 1 is a perspective view of an embodiment of an agricultural implement formed according to the present invention.

Referring now to the drawings, and more particularly to FIG. 1, there is shown an embodiment of a tillage implement of the present invention. In the illustrated embodiment, the tillage implement is in the form of a field cultivator 20 for tilling and finishing soil prior to seeding.

Field cultivator 20 is configured as a multi-section field cultivator, and includes a main frame section 22 and a plurality of wing sections 24, 26 and 28. The left wings sections are designated 24A, 26A and 28A, and the right wing sections are designated 24B, 26B and 28B. Wing sections 24A and 24B are each inner wing sections, wing sections 26A and 26B are each middle wing sections, and wing sections 28A and 28B are each outer wing sections. It should be appreciated that while the field cultivator 20 shown in FIG. 1 includes a main frame section 22 with multiple wing sections 24A, 24B, 26A, 26B, 28A, 28B, the field cultivator 20 according to the present invention may only have one frame section.

Main frame section 22 is the center section that is directly towed by a traction unit, such as an agricultural tractor (not shown). Main frame section 22 includes a pull hitch tube 30 extending in a travel direction 32, and a tool bar 34 which is coupled with and extends transverse to pull hitch tube 30. Reinforcing gusset plates (not numbered) may be used to strengthen the connection between pull hitch tube 30 and tool bar 34. Main frame section 22 generally functions to carry a shank frame 38 for tilling the soil, and a rear auxiliary implement 40 for finishing the soil. Rear auxiliary implement 40 includes a spring tooth drag 42 and a rolling basket 44 (also known as a crumbler basket) which coact with each other to finish the soil. However, the rear auxiliary implement can be differently configured as a different construction, such as a spike tooth drag, cultivator shanks, etc.

Shank frame 38 generally functions to carry cultivator shanks 46 with ground working tools 48, such as sweeps, at their lower ends for tilling the soil. The shanks 46 can be mounted to the shank frame 38 in any appropriate manner. As can be seen in FIG. 1, there can be a large number of shanks 46 carried by the implement 20 at any given time. Due to the large number of shanks 46 that are carried by the implement 20, equipping all of the shanks 46 with tools 48 would take a large amount of time if each tool 48 needed to be bolted to its respective shank 46. Similarly, removing the tools 48 from the shanks 46 is a time-consuming process.

Figure 2:
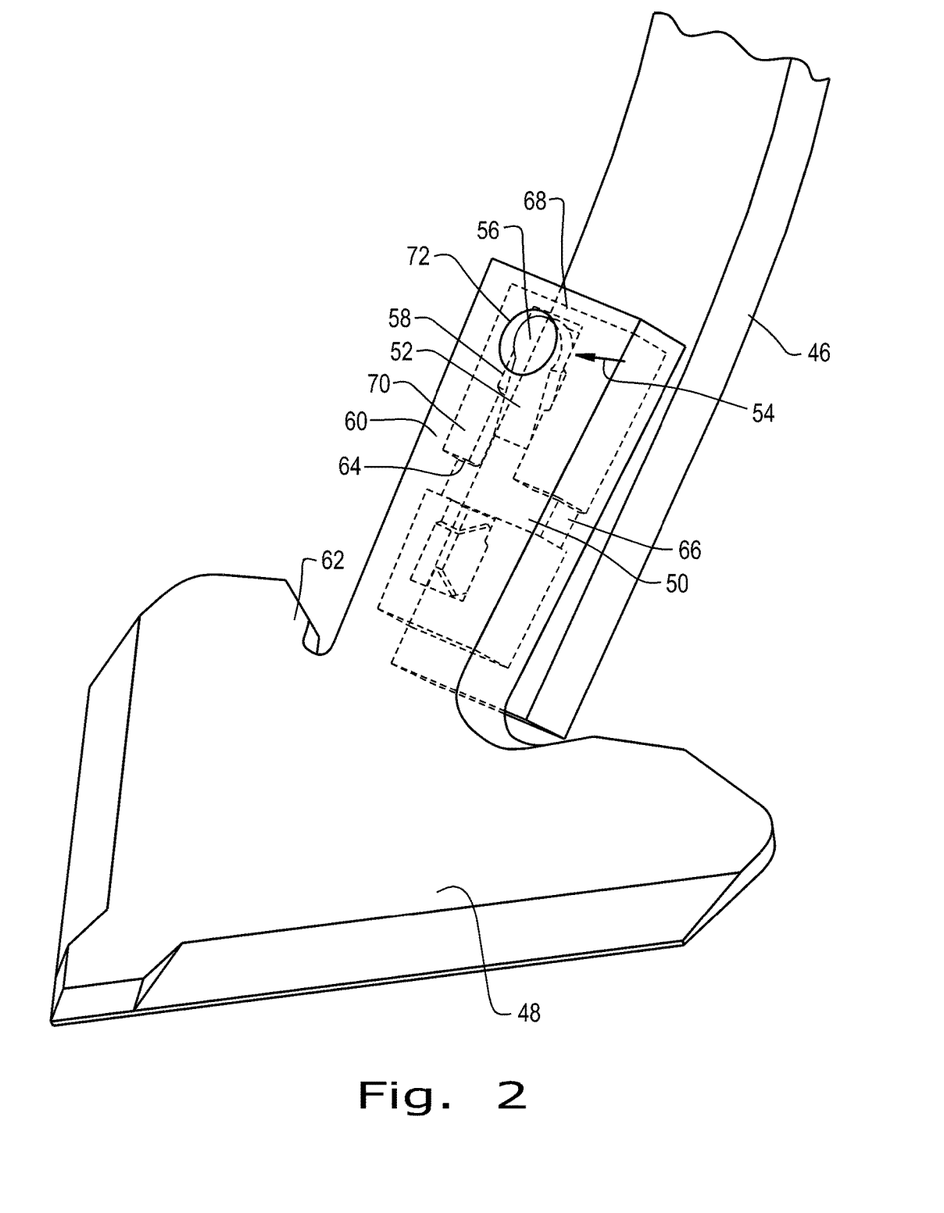
FIG. 2 is a perspective view of an embodiment of a ground working tool locked to a retaining clip of a shank according to the present invention.

Referring now to FIG. 2, an embodiment of one of the tools 48 is shown locked to one of the shanks 46. The tool 48, as shown, is a sweep, but it should be appreciated that the tool 48 can be other types of ground working tools that are used in such implements. As can be seen, the shank 46 includes a retaining clip 50 that is press fitted to the shank 46, which is described further herein, so the retaining clip 50 is secured to the shank 46. The retaining clip 50 includes a movable lock 52 biased in a locking direction, signified by arrow 54. The movable lock 52 can include a button 56 which is biased in the locking direction 54 by a spring 58 (shown in FIG. 3) so the button 56 normally assumes a locking position. The movable lock 52 fills a locking opening 58 formed in the tool 48 so that the tool 48 resists being pulled off the shank 46. The locking opening 58 of the tool 48 can be formed, for example, in a mounting portion 60 of the tool 48 which has a rectangular cross-section and attaches to a shovel portion 62 of the tool 48 that will work the soil when as the implement 20 traverses a field. The locking opening 58 can be formed in a bottom surface (not shown) of the mounting portion 60 so the movable lock 52 automatically fills the locking opening 58 as the tool 48 slides along the retaining clip 50. It should be appreciated that the shape of the mounting portion 60 and shovel portion 62 shown herein are exemplary only, and a wide variety of shapes can be utilized for the portions 60, 62 according to the present invention.

To ensure that the tool 48 slides properly along the retaining clip 50, the mounting portion 60 can have tool grooves 64 formed therein that slide along retaining edges 66 (also shown in FIG. 3) of the retaining clip 50. Once the tool 48 is aligned with the retaining clip 50 so the retaining edges 66 are placed in the tool grooves 64, a user can strike the tool 48 onto the retaining clip 50 with a hammer or other tool. When the tool 48 is a sweep, such as the tool shown throughout, such sweeps are commonly known as "knock-on sweeps" since the sweeps are "knocked on" to the shank 46 to lock. Once the tool 48 has advanced sufficiently along the retaining clip 50, the movable lock 52 can be biased into the locking opening 58 so the tool 48 resists being removed from the shank 46. The movable lock 52 can, for example, abut against a leading edge 68 of the mounting portion 60 of the tool 48, resisting the tool 48 being pulled off the shank 46. The mounting portion 60 can also include a cover 70 with an access opening 72 formed therein which will align with the movable lock 52 when the tool 48 is properly placed on and locked to the retaining clip 50. The cover 70 shields the movable lock 52 from dirt and other debris to minimize the risk that the movable lock 52 will be depressed out of the locking opening 58 and allow the tool 48 to slide off the shank 46 during operation of the implement 20. The access opening 72, therefore, allows a user to press the movable lock 52 in an unlocking direction (opposite to the locking direction 54) manually or with a tool to depress the movable lock 52 out of the locking opening 58 and knock the tool 48 off the shank 46 with a hammer or other similar tool.

Figure 3:
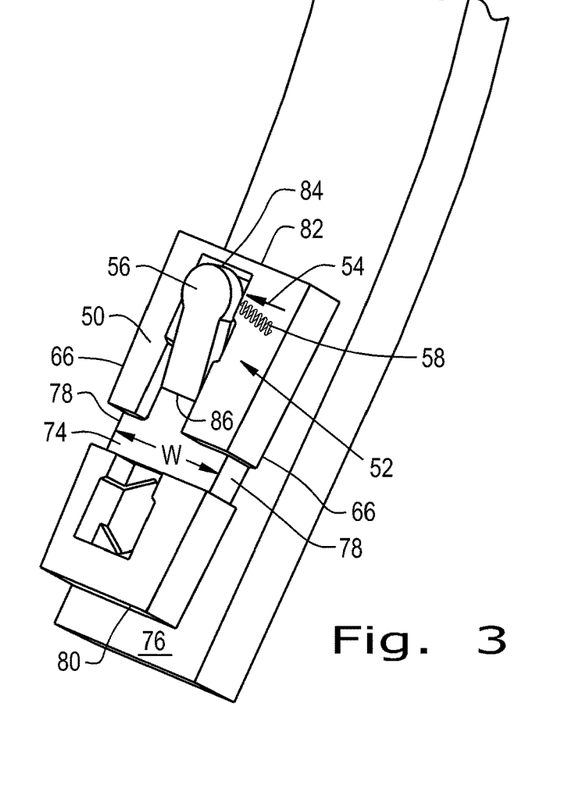
FIG. 3 is a perspective view of the shank shown in FIG. 2 without the ground working tool attached.

Referring now to FIG. 3, the shank 46 is shown with the retaining clip 50 attached and the tool 48 removed. As can be seen, the shank 46 can include an adapter 74 which is anchored to a surface 76 of the shank 46 by sliding into a groove (not seen) of the shank 46. Alternatively, the adapter 74 can also be anchored to the shank 46 by fasteners, adhesives, etc., so long as the adapter 74 is anchored to the surface 76 of the shank 46 to allow secure attachment of the retaining clip 50 to the shank 46. The adapter 74 can have a pair of clip edges 78 that the retaining clip 50 press fits onto in order to secure the retaining clip 50 to the shank 46. The retaining clip 50 can press fit onto the clip edges 78, for example, by having clip grooves (not seen) that grip the clip edges 78. To easily attach the retaining clip 50 to the shank 46, the clip edges 78 can be tapered from a front end 80 of the adapter 74 to a back end 82 of the adapter 74, i.e., a width W defined between the clip edges 78 can increase from the front end 80 to the back end 82. Tapering the clip edges 78 makes it so that as the retaining clip 50 slides along the clip edges 78 from the front end 80 toward the back end 82 of the adapter 74, the friction between the retaining clip 50 and the clip edges 78 increases until the retaining clip 50 is press fitted onto the clip edges 78 and secured to the adapter 74. It should be understood that the retaining clip 50 can be press fitted onto a single clip edge and the clip edge(s) 78 can be formed directly in the shank 46, i.e., the adapter 74 is optional.

As shown in FIG. 3, the button 56 of the movable lock 52 can be biased in the locking direction 54 by the spring 58 such that a first end 84 of the button 56 is raised higher than a second end 86 of the button 56, relative to the anchoring surface 76 of the shank 46. In this sense, the button 56 forms a ramp extending from the end 84 of the button to the opposite end 86 of the button 56. When the button 56 is a ramp, the leading edge 68 of the mounting portion 60 of the tool 48 can apply force to the button 56 in the unlocking direction as the tool 48 is pushed along the retaining clip 50. This force can compress the spring 58 biasing the button 56 in the unlocking direction, temporarily forcing the first end 86 of the button 56 down to allow further advancement of the tool 48. Once the tool 48 has advanced such that the locking opening 58 is over the button 56, the button 56 can spring into the locking opening 58 to lock the tool 48 to the retaining clip 50 and resist pulling the tool 48 off the shank 46.

Figure 4:
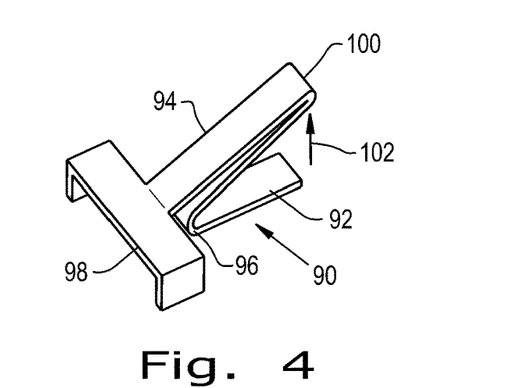
FIG. 4 is a perspective view of another embodiment of a movable lock of a shank according to the present invention.

Referring now to FIG. 4, another embodiment of a movable lock 90 formed according to the present invention is shown. The movable lock 90 shown in FIG. 4 can be used similarly to the movable lock 52 shown in FIGS. 2-3 to lock the tool 48 to the shank 46. The movable lock 90 has a fitting portion 92 that can be connected to a surface of a retaining clip or adapter. The movable lock 90 also includes a locking portion 94 that is connected to the fitting portion 92 by a bend 96 formed in the movable lock 90. The fitting portion 92 can normally be flush with a first end 98 of the locking portion 94 when the locking portion 94 is unloaded, with a second end 100 of the locking portion 94 being raised, relative to the fitting portion 92, compared to the first end 98. It should be appreciated that the first end 98 of the locking portion 94 does not need to be flush with the fitting portion 92 when the locking portion 94 is unloaded, but may only be closer to the fitting portion 92, compared to the second end 100, when the locking portion 100 is unloaded. Due to the bend 96 formed in the movable lock 90, the locking portion 94 is normally biased in a locking direction, signified by arrow 102, to maintain the second end 100 of the locking portion 94 raised in comparison to the first end 98. When a tool, such as the tool 48 shown in FIGS. 2-3, advances along the locking portion 94, the tool 48 exerts bending forces on the locking portion 94 that force the second end 100 of the locking portion 94 in a direction opposite to the locking direction 102, i.e., closer to the fitting portion 92. Biasing the second end 100 of the locking portion 94 toward the fitting portion 92 causes spring-like forces to develop in the bend 96 that bias the second end 100 in the locking direction 102. Once the tool 48 has advanced such that the locking opening 58 passes over the second end 100 of the locking portion 94, the forces in the bend 96 force the second end 100 of the locking portion 94 into the locking opening 58. The second end 100 of the locking portion 94 being in the locking opening 58 allows the tool 48 to resist being removed from the shank 46. As the bend 96 formed in the movable lock 90 acts similarly to a spring to bias the second end 100 of the locking portion 94 in the locking direction 102, the movable lock 90 can be formed, for example, from spring steel or other materials commonly used to manufacture springs. When it is desired to remove the tool 48 from the shank 46, a user can depress the second end 100 to remove the second end 100 from the locking opening 58 and then pull the tool 48 off the shank 46.

Figure 5:
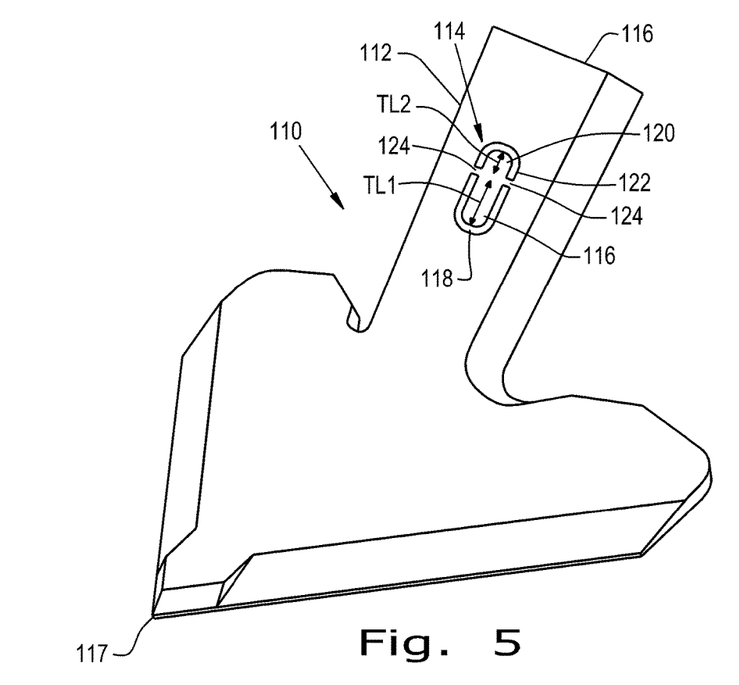
FIG. 5 is a perspective view of another embodiment of a ground working tool according to the present invention which includes a tool clip.
Figure 6:
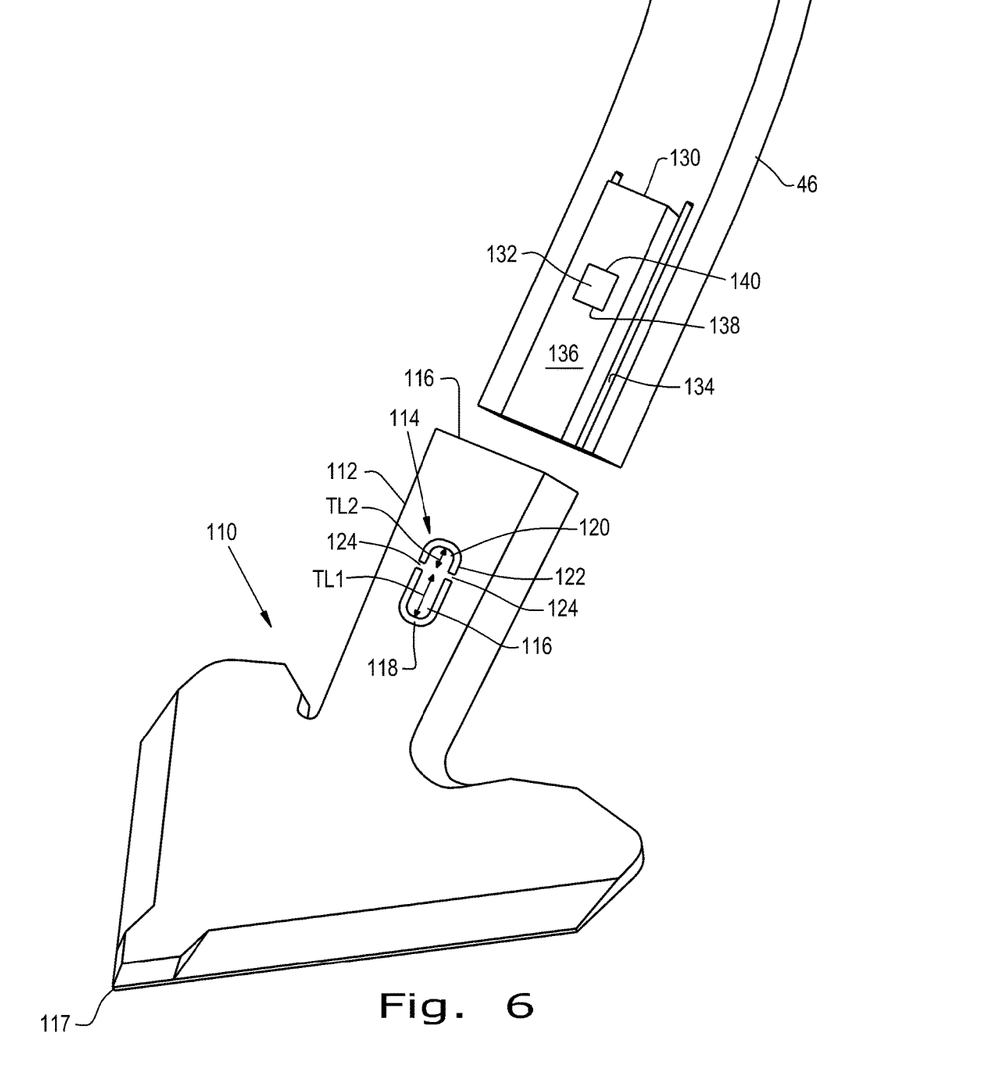
FIG. 6 is a perspective view of the tool shown in FIG. 5 advancing in a tool guide of a retaining clip of a shank according to the present invention.
Figure 7:
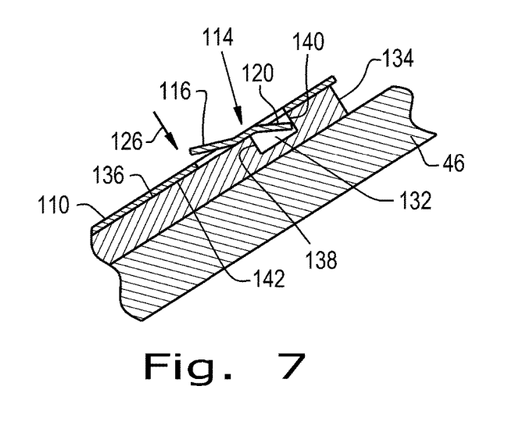
FIG. 7 is a side view of the locked tool clip and retaining clip shown in FIG. 6 locked together.

In other embodiments of the tillage implement 20 formed according to the present invention, and referring now to FIGS. 5-7, the portion locking the tool to the shank can be included as a part of the tool. Referring specifically now to FIG. 5, a tool 110 is shown which includes a tool clip 112 having a reversibly deformable portion 114. The tool 110 can be a sweep, similar to the previously described tool 48, or a different kind of ground working tool. As shown in FIG. 5, the tool clip 112 can, for example, be formed adjacent to a non-working end 116 of the tool 110 which is opposite a working end 117 of the tool 110 that will work the ground. The reversibly deformable portion 114 can be formed of a material that a human operator can deform by hand in order to lock and unlock the tool clip 112 from the shank 46, which is described further herein. The reversibly deformable portion 114 can be formed, for example, to have a first tab 116 partially surrounded by a first cutout 118 and a second tab 120 which is connected to the first tab 116 and partially surrounded by a second cutout 122. In this sense, the reversibly deformable portion 114 can be formed in the tool clip 112 by forming the cutouts 118 and 122 in the tool clip 112, with the reversibly deformable portion 114 being the material that is left between the cutouts 118 and 122 after the cutouts 118 and 122 are formed. When the reversibly deformable portion 114 is formed this way, the tabs 116 and 120 can pivot about material bridges 124 that connect the tabs 116 and 120 to the rest of the material of the tool clip 112. The tabs 116 and 120 can be formed asymmetrically, as shown, by forming the cutouts 118 and 122 asymmetrically. As shown in FIG. 5, the first tab 116 can have a first tab length TL1 which is greater than a second tab length TL2 of the second tab 120. The tool clip 112 can also be formed so that the second tab 120 is naturally biased in a locking direction, signified by arrow 126 in FIG. 7, the significance of which is discussed further herein.

Referring now to FIG. 6, the tool 110 is shown being advanced in order to lock to a retaining clip 130 which is secured to the shank 46. The retaining clip 130 can be secured to the shank 46 in any suitable way, as previously described. The retaining clip 130 has a locking opening 132 formed therein which allows the reversibly deformable portion 114 of the tool clip 112 to insert therein as the tool 110 slides along the retaining clip 130 such that the reversible deformable portion 114 of the tool clip 112 aligns with the locking opening 132. When the reversibly deformable portion 114 is formed so the second tab 120 is naturally biased in the locking direction 126, the second tab 120 will automatically be pressed into the locking opening 132 when the second tab 120 passes the locking opening 132, locking the tool clip 112 (and tool 110) to the retaining clip 130 (and shank 46). To ensure that the tool 110 is properly placed to align the second tab 120 with the locking opening 132, the retaining clip 130 can have a tool guide 134, shown as a recess, formed therein that accommodates the tool clip 112 of the tool 110 and guides sliding of the tool clip 112 along the retaining clip 130. Further, the tool guide 134 can also prevent the tool 110 from being pulled away from an abutment surface 136 of the retaining clip 130 that the tool 110 will contact during operation of the implement 20. It should be appreciated that while the tool guide 134 is shown as a recess, the tool guide 134 can be formed in a number of other different ways to guide the placement of the tool clip 112 and the tool 110 and prevent the tool 110 from being pulled away from the abutment surface 136.

Referring now to FIG. 7, it can be seen that the tool 110 has been advanced in the tool guide 134 sufficiently to allow the reversibly deformable portion 114 to insert into the locking opening 132 and lock the tool clip 112 to the retaining clip 130. As the second tab 120 is naturally biased in the locking direction 126, the second tab 120 will be forced into the locking opening 132 as soon as the tool 110 is advanced so the second tab 120 advances past a front end 138 of the locking opening 132.

When the second tab 120 has not advanced past the front end 138 of the locking opening 132 but the tool 110 is sliding along the tool guide 134, the second tab 120 is forced in a direction opposite to the locking direction 126 by contact with the abutment surface 136. Once the second tab 120 is no longer contacting the abutment surface 136 and within the locking opening 132, the reversibly deformable portion 114 can prevent excessive sliding of the tool 110 along the tool guide 134 by abutting against a back end 140 of the locking opening 132. The second tab 120 is also prevented from sliding out of the locking opening 132 by the contact between the second tab 120 and the front end 138 of the locking opening 132 due to the second tab 120 being at least partially below a bottom surface 142 of the retaining clip 130, with contact between the first tab 116 and the abutment surface 136 of the retaining clip 130 increasing the amount of force which must be applied to the second tab 120 opposite the locking direction 126 to remove the second tab 120 from the locking opening 132 and allow the tool clip 112 to unlock from the retaining clip 130.

To unlock the tool clip 110 from the retaining clip 130, a user can force the second tab 120 in an unlocking direction which is opposite to the locking direction 126. Since the first tab 116 partially or fully abuts against the abutment surface 136 of the retaining clip 130 as the second tab 120 is forced in this manner, the second tab 120 must be forced sufficiently to at least partially deform the reversibly deformable portion 114 and remove the reversibly deformable portion 114 from the locking opening 132. Once the reversibly deformable portion 114 has been removed from the locking opening 132, the tool clip 112 is unlocked from the retaining clip 130 and the tool 110 can be removed from the shank 46. The second tab 120 can be forced, for example, by a user manually pushing on the second tab 120 in the direction opposite to the locking direction 126, allowing for a user to easily remove the tool 110 from the shank 46 without needing to use any special tools.

Figure 8:
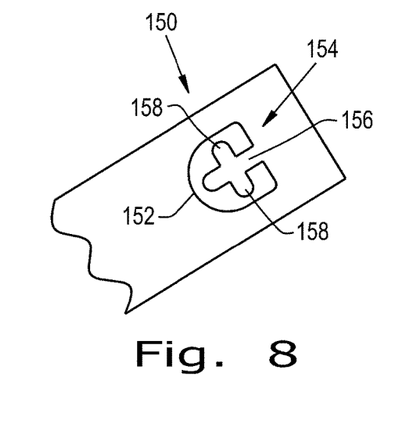
FIG. 8 is a perspective view of yet another embodiment of a tool clip of a ground working tool formed according to the present invention.

Referring now to FIG. 8, an alternative embodiment of a tool clip 150 formed according to the present invention is shown. The tool clip 150 is formed with a single cutout 152 leaving a reversibly deformable portion 154 having a main portion 156 connected to the rest of the material of the tool clip 150 and a pair of wings 158 extending transversely from the main portion 156. Like the previously described reversibly deformable portion 114, the reversibly deformable portion 154 can be naturally biased in a locking direction (not shown). As such, the tool clip 150 can be locked to the retaining clip 130 in a similar fashion to the tool clip 112 previously described. To release the tool clip 150 from the retaining clip 130, and therefore unlocking the tool from the shank, a user can grab the wings 158 of the reversibly deformable portion 154, manually or using a tool, and pull the reversibly deformable portion 154 out of the locking opening 132 of the retaining clip 130. Once the reversibly deformable portion 154 has been pulled out of the locking opening 132, the tool can then be removed from the shank.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
a frame;
a shank mounted to the frame and including on an upper surface of the shank an adapter which has at least one clip edge;
a retaining clip press fitted to the at least one clip edge of the adapter on the upper surface of the shank, the retaining clip including a housing which includes a flat upper surface with spaced-apart parallel lateral sidewalls including retaining edges on each lateral outer surface of each lateral sidewall of the housing, the housing configured to press fit over at least opposing parallel lateral sides of the adapter, the flat upper surface of the housing including a slot which includes therein a movable lock configured to be biased in a locking direction, the movable lock including a button and a ramp positioned between the retaining edges of the parallel lateral sidewalls of the housing of the retaining clip and movably coupled thereto; and
a ground working tool including a mounting portion configured to be positioned on the upper surface of the shaft over the housing of the retaining clip having the movable lock, wherein the mounting portion conforms to an outer surface of the housing of the retaining clip such that an inner surface of the mounting portion is configured to fit against the outer surface of the housing of the retaining clip, and the mounting portion includes tool grooves on each inner lateral side thereof which are positioned against the retaining edges of the parallel lateral sidewalls of the housing to hold the mounting tool to the housing of the retaining clip to connect the ground working tool to the upper surface of the shank, a locking opening formed in the mounting portion, the button of the movable lock biased to move upward into the locking opening of the mounting portion to at least partially fill the locking opening to resist the ground working tool from being removed from the upper surface of the shank.

2. The agricultural implement according to claim 1, wherein when the button extends into the locking opening, the ramp remains positioned in the slot between the retaining edges of the parallel sidewalls of the housing of the retaining clip, and wherein the shaft and the ground engaging tool are in a non-axial alignment relative to each other.

3. The agricultural implement according to claim 2, wherein the movable lock is configured to be biased via a spring under the button so that the button is biased to move in the locking direction to extend into the locking opening, and when the button is depressed externally through the locking opening, the button moves in an unlocking direction opposite to the locking direction and the button moves out of the locking opening to unlock the ground working tool from the upper surface of the shank while the ramp remains positioned in the slot between the retaining edges of the parallel sidewalls of the housing of the retaining clip.

* * * * *